United States Patent

[11] 3,599,439

[72] Inventors Dwight C. Lewis
Elkhart;
Justin E. Wilder, Goshen, both of, Ind.
[21] Appl. No. 872,188
[22] Filed Oct. 29, 1969
[45] Patented Aug. 17, 1971
[73] Assignee Penn Controls, Inc.
Oak Brook, Ill.

[54] SAFETY CONTROL FOR A MOTOR DRIVEN COMPRESSOR
9 Claims, 4 Drawing Figs.
[52] U.S. Cl............................................. 62/158,
62/231, 62/468
[51] Int. Cl............................................. F25b 19/00
[50] Field of Search........................................... 62/157,
158, 468, 231; 417/13, 12, 281

[56]  References Cited
UNITED STATES PATENTS
3,312,081  4/1967  Berger........................... 62/158

*Primary Examiner*—Meyer Perlin
*Attorney*—A. J. De Angelis

ABSTRACT: An oil pressure responsive control for a motor-driven refrigeration compressor, which control permits a predetermined, consecutive number of starts of the compressor motor. If during such starts proper lubricating oil pressure is sensed by a pressure responsive switch, the compressor motor is placed in the running mode subject to stopping by normal operating controls, such as a thermostat. Should the oil pressure fail to obtain the desired level for proper lubrication during such automatic predetermined number of starts, the system is placed on "lock out" for attention by a mechanic. Upon any successful running, the cycling starting control is automatically reset to its initial zero position.

PATENTED AUG 17 1971 3,599,439
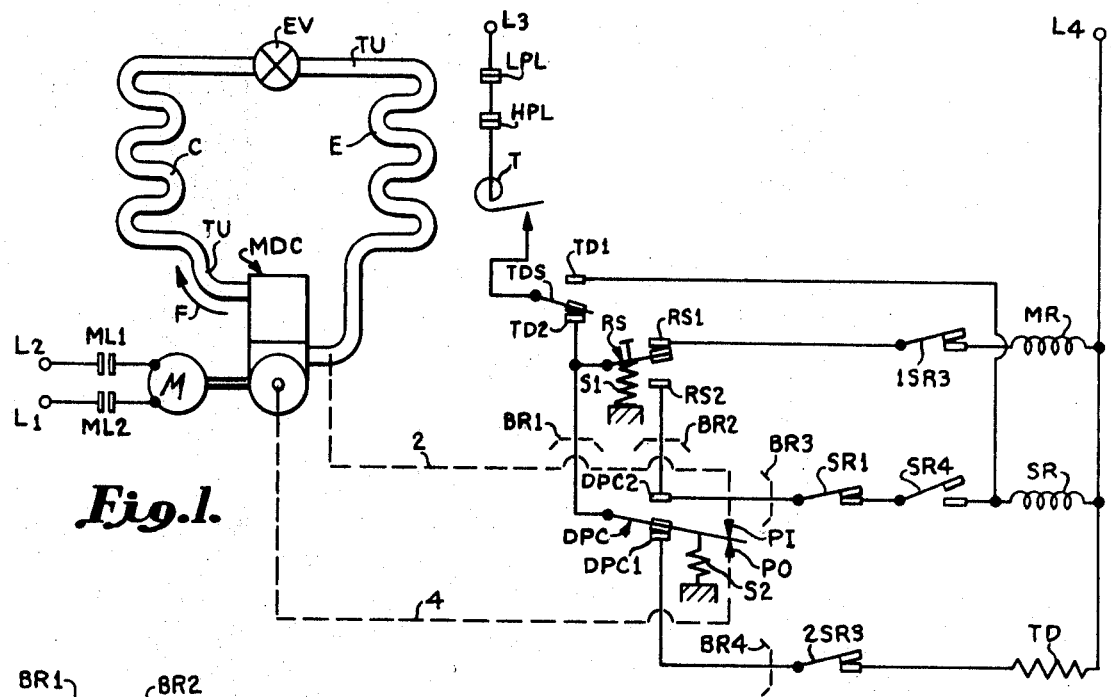
Fig.1.
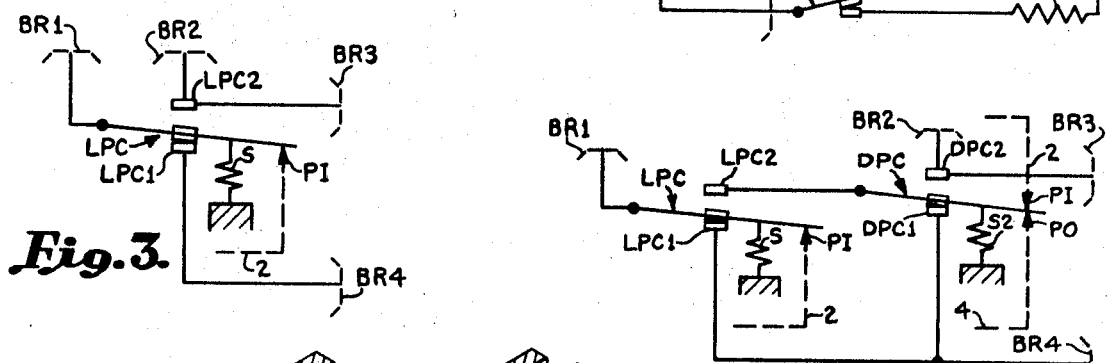
Fig.3.
Fig.4.
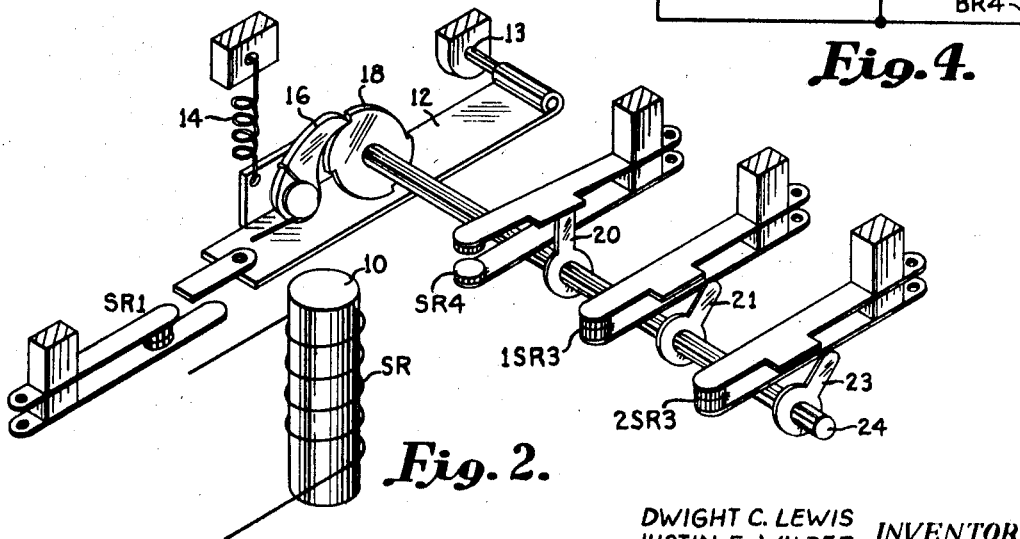
Fig.2.
DWIGHT C. LEWIS
JUSTIN E. WILDER INVENTOR.(S)
BY A. J. De Angelis
ATTORNEY.

SAFETY CONTROL FOR A MOTOR DRIVEN COMPRESSOR

The invention relates to safety controls for controlling the operation of a compressor motor in refrigeration systems and, more particularly, to such a control which in response to the failure of the compressor lubricating oil pressure attaining a certain pressure at starting, shuts down the system.

In the present day motor-driven refrigeration systems pressurized oil lubrication of the compressor is required without which bearing failure of the compressor occurs quickly. It has, therefore, become usual to provide lubrication oil protection controls for such compressors which comprise mechanism which senses that oil at a predetermined pressure is being delivered by the oil pump to the compressor bearings and mechanisms. Upon starting up of the compressor motor, if insufficient pressure to the compressor motor is sensed during a trial period, the system is shut down to prevent damage to the compressor.

In other applications (for example where the compressor is operated under low ambient temperature conditions) proper lubricating pressure may be sensed and yet the system be put in "shutdown" condition by a low-pressure limit control sensing input pressure to the compressor.

However, the present trend towards increased refrigeration of foods, drugs, etc., often results in huge product losses in the event of an undetected shut down of a refrigeration system. Even when detected, maintenance personnel are sometimes not readily available and, when available, are costly. It has, therefore, become desirable to minimize shutdowns.

This is especially true, when the shutdown is due to a transient condition and not to a real failure of the oil pressure lubricating mechanism. Also, in refrigerated trucks and trains or roof-mounted cooling units for plants and large buildings the refrigeration units are relatively inaccessible to service personnel, making it imperative that shutdown occurs only when absolutely necessary.

Often shutdown occurs upon failure of oil pressure to develop within a certain time after starting due to the refrigerant intermixing with the oil during operation and settling in the oil crank case or sump to prevent proper development of oil pressure for lubrication. Starting of the compressor motor and running for a short time tends to purge the liquid refrigerants from the crank case such that oil pressure is the sufficient for the purpose of lubrication. However, under this condition, the time required to supply lubricating oil to the bearings may be such that continuous operation may cause them to heat up and result in serious damage to the compressor. Several short-duration runs separated by short cooling periods will avoid overheating the bearings, while allowing additional time for oil to be pumped to the bearings. However, an unlimited number of attempts to start when oil has failed to return to the crank case after flowing through the refrigeration cycle could result in serious damage to the compressor.

In order to minimize nuisance "false" lockouts at starting and those due to the presence of refrigerant in the crank case, which refrigerant can be purged, it is desirable to provide a control which effects a safe number of time starting attempts before the system is put on "lockout."

Prior art attempts have combined the pressure responsive control with a sequence timer to permit a predetermined number of starting attempts. However, such timers have been found to have a relatively short life when mounted on vibrating equipment such as compressors.

It is, therefore, desirable to provide a safety control for refrigeration compressors, which control responds to the compressor oil pressure upon starting and prevents running mode operation of the compressor unless such oil pressure has attained a predetermined level sufficient for proper operation. In addition, such control, upon the failure of the lubrication mechanism to provide sufficient lubrication, stops the compressor motor operation, while providing a predetermined safe number of automatic restarting attempts by means of simple, inexpensive electromechanical switching apparatus.

It is the object of the invention to provide such a safety control of simple and economical construction using only electrothermomechanical switching apparatus for timing and cycling.

In carrying out the invention according to a preferred embodiment, the subject safety control provides a differential oil pressure switch which measures the net pressure delivered to the compressor bearings from the oil-pressure pump for placing the control in running mode when sufficient net oil pressure is attained. Upon failure to attain such pressure, cycling mechanism in the form of an electrothermo time delay switch in combination with a stepping relay, cycles the control for a total of three starting attempts with a waiting period between each attempt after which the stepping relay places the system on "lockout" subject to manual reset by maintenance personnel.

In a slightly modified embodiment, the cycling control is made subject to the low pressure limit rather than responsive to differential lubricating oil pressure.

In another modified embodiment, the cycling control is responsive to both the differential lubricating oil pressure and the low-pressure limit, such that the control cycle to "lock out" unless both pressures attain their respective proper levels during one of the three starting attempts.

Features and advantages of the invention will be seen from the above, from the following description of the preferred embodiment, when considered in conjunction with the drawing and from the appended claim.

In the Drawing:

FIG. 1 is a simplified, diagrammatic representation of a compressor driven refrigeration system of the electric motor driven type, showing the refrigeration circuit, the motor operating circuit subject to thermostatic control, and including a schematic wiring diagram of a pressure responsive cycling control responsive to differential oil pressure and embodying the subject invention;

FIG. 2 is a fragmentary, simplified, diagrammatic representation in perspective of an electromechanical "stepper"-type relay used in the wiring diagram of FIG. 1;

FIG. 3 is a modification of a portion of the wiring diagram of FIG. 1 to make the subject control responsive to pressure at the compressor input (low pressure), rather than differential oil pressure and is intended to replace the portion of FIG. 1 indicated by brackets BR1 to BR4; and FIG. 4 is a representation of a portion of the FIG. 1 wiring diagram similar to FIG. 3, but modified to made the subject control responsive to both low pressure and differential oil pressure.

A typical compressor operated refrigeration system is shown in FIG. 1 and includes: a motor driven compressor, generally designated MDC, and including a motor M. A condenser C, an expansion valve EV and an evaporator E are interconnected to compressor MDC by tubing TU, as shown. Refrigerant flows from the compressor MDC, through the condenser C, then through the expansion valve EV and the evaporator E back to the compressor in a standard manner, as is indicated by the directional arrow F.

Electrical power from any convenient source (not shown) is applied over supply lines L1, L2 to energize the motor of motor-driven compressor MDC; and over supply lines L3, L4 to energize the control circuits for the motor. A thermostat, generally designated T, has its contacts connected in line L3 in series with the usual safety controls LPL, HPL in a form of normally closed contacts for controlling motor operation. The thermostat and safeties may be known generally as the operating controls of the system. Normally closed electrical contacts LPL and HPL may be the usual low-pressure and high-pressure limits respectably, of the refrigerators system for preventing operation when such high or low limits are exceeded.

1 MR designates the coil of a starting relay for the compressor motor, SR designates the energizing coil of a stepping-type relay, while TD designates the heater of a timer of the thermal expansion type; as for example, the warp switch which is the subject of the U.S. Pat. No. 2,814,686 issued to J. Wilder, Nov. 26 1957.

Contacts ML1, ML2 in the energizing circuit for the compressor motor M are contacts of motor relay MR. RS designates a manually operated reset switch biased by spring S1 into engagement with contacts BS1, as shown, and which may be actuated to open contacts RS1 and close contacts RS2.

TDS designates the actuator of the time delay switch TDS and is shown for the normally closed condition of contacts TD2 for the cooled condition of its heater TD. Upon energization of heater TD for a predetermined time interval, TDS is actuated to open contacts TD2 and close contacts TD1. At the expiration of a predetermined cooling times, after the heater TD is deenergized, switch TDS returns to the normally closed condition of contacts TD2.

A differential oil pressure responsive switch DPC is shown schematically as having an actuator PI connected by broken line 2, to the pressure input side of the motor driven compressor and actuator PO connected by broken line 4, to the pressure output of its oil pump. Switch DPC is maintained by biasing spring S2 with its contacts DPC1 normally closed and opens its contacts DPC1 and closes contacts DPC2 under conditions where the net difference between the input and output of the oil pressure is deemed sufficient to provide pressurized lubrication of the compressor motor.

Stepping relay SR is provided with four sets of contacts designated SR1, 1SR3, 2SR3, and SR4 and are shown for the initial zero position of the stepping relay, as will now be described with reference to FIG. 2.

The stepper relay of FIG. 2 is shown in its initial or zero position and includes an energizing coil SR wound around a pole 10. Energization of coil SR causes magnetic attraction and movement of an armature 12 downward towards pole 10 about its pivot point 13. Such downward movement extends spring 14 attached to armature 12. Spring 14 tends to return armature 12 to its initial upward position upon deenergization of the steeper relay coil SR. Armature 12 actuates with its free end the movable contact of contact pair SR1. Armature 12, upon actuation downward, separates steeper relay contacts SR1 and upon its release and return upward by the force of spring 14, allows contacts SR1 to reclose. Additionally, with each release of the armature, pawl 16 cams a ratchet 18 clockwise, rotating cams 20, 21 and 23 mounted in predetermined positions along rod 24 attached to ratchet 18. COntacts SR4, 1SR3 are biased to closed position by the resiliency of their leaf springs. In zero position, contacts SR4 are held open by cam 20, as shown.

In operation, the steeper relay upon a first energization of its coil SR attracts armature 12 downward, separating contacts SR1. Upon deenergization of coil SR, armature 12 is returned by coil spring 14 to its upward position, reclosing contact SR1 and camming ratchet 18 a first step. This first step of rotation causes cam 20 tor release contacts SR4, which are allowed to close.

With every subsequent energization and deenergization of relay coil SR, relay contacts SR1 open and then reclose. Contacts SR4 remain closed until the relay returns to its zero position on the fourth step when they are cammed open again.

Therefore, contacts SR4 close on the first step of the relay (at the first release of the coil SR) and remain closed during the second and third steps, reopening on the fourth step. COntacts 1SR3 and 2SR3 are both cammed open by cams 21 and 23 on the third step of the relay (that is on the third deenergization of relay coil SR and recloses at the fourth or return to zero position of the stepper relay.

To demonstrate the operation of the cycling control, assume that the pressures at the high and low sides of the compressor are both within operating ranges such that low and high limit contacts LPL and HPL (FIG. 1) of the operating controls are closed, as shown. Next, assume that thermostat contacts T close calling for starting of the compressor motor. Under such conditions, an energizing circuit is completed for the heater TD of the time delay switch TDS; the circuit extending from supply line L3 through presently closed operating control contacts LPL, HPL, and T, through warp switch contacts TD2 of the time delay switch TDS, then through normally closed contacts DPC1 of the oil pressure differential sensing switch and contacts 2SR3 of the stepping relay through heater element TD to supply line L4. Heater TD, thus energized starts to apply heat to the time delay warp switch TDS. After a predetermined time such heat will be sufficient to cause actuation of its time-delay switch contacts TD2 open and its contacts TD1 closed, terminating a first timed trial period.

During such first period it is determined whether sufficient lubrication oil pressure is being provided by the pump (not shown) of the compressor to warrant placing the mechanism in "run" condition or "shutdown," as will now be described.

Simultaneously with energization of heater TD a circuit is also completed for coil MR of the motor relay through presently closed time delay switch contacts TD2, manual reset switch contacts RS1 (presently closed), contacts 1SR3 (also closed), of the stepper relay and coil MR to supply line L4. Motor relay MR, upon energization, engages its contacts MLI, ML2 energizing (from supply lines L1, L2) the motor M of the compressor, thereby starting operation of the compressor.

Next assume that the differential pressure-sensing switch DPC senses by sensors PO and P1 that sufficient oil being delivered by the pump for lubrication purposes, causing pressure-sensing switch DPC to open its contacts DPC1 and closes its contacts DPC2, before time-delay switch TDS has heated sufficiently to be operated Under such conditions, pressure switch DPC, in opening its contacts DPCI, deenergizes time-delay heater TD, stopping the timing of the trial period, and causing heater TD to start to cool down. At the same time, pressure switch DPC closes its contacts DPC2, but without effect on stepper relay coil SR, since its contacts SR4 are presently opened, as shown. Thus, with sufficient oil lubrication being sensed, the motor compressor is placed in its "run" mode subject to the operating controls of the thermostat an limits previously described.

For one tested embodiments, time-delay switch TDS was constructed to actuate its contacts from TD2 closed to TD1 closed approximately 120 seconds after energization of its heater TD. This gave a 120-second trial period during which sufficient net oil pressure had to be sensed to maintain the system in "run" condition.

Next assume in the above example that the pressure-sensing switch DPC does not sense adequate net oil pressure before the end of the 120 second timed trial period, but maintains its contacts DPC1 closed a sufficient time to cause heater TD to actuate time delay switch TDS, opening its contacts TD2 and closing its contacts TD1. Thus, approximately 120 seconds after energization of heater TD and starting up of the motor compressor through motor relay MR (upon failure of the net oil pressure to reach operating level), opening of contacts TD2 interrupts the energizing circuit of motor relay MR. Relay MR releases, opening of its contacts ML1, ML2 stopping operation of the compressor.

At the same time, stepping relay SR is energized through the closing of time delay switch contacts TD1. Upon such energization (as was described with respect to FIG. 2), stepper SR opens its contacts SR1, but without effect at this time.

At the same time opening of contacts TD2 causes time delay switch heater TD to be deenergized and starts to cool timing a second period. After approximately 75 seconds for one tested embodiment, the TD heater has cooled sufficiently to cause the switch TDS to return to its initial position, thereby reopening its contacts TD1 and reclosing its contacts TD2. As previously described, closing of contacts TD2 completes a circuit through reset switch RS and presently closed contacts 1SR3, energizing motor relay MR causing restarting of the compressor motor for a second try at attaining sufficient net oil pressure.

Reopening of contacts TD1 simultaneously deenergizes stepping relay coil SR which, upon release, recloses its contacts SR1 and as it steps to its first position, closes its contacts SR4, preparing a circuit for the relay coil SR through contacts DPC2 of the differential pressure control switch, or through reset switch contacts RS2, but without affect at this time.

Next assume that again net oil pressure fails to reach operating level such that pressure sensing switch DPC remains with its contacts DPC1 closed maintaining the heater TD energized. After the first trial, heater TD has sufficient residual heat that switch TDS is actuated approximately 60 seconds after being energized in one tested embodiment. Upon actuation of time delay switch TDS to open its contacts TD2 and reclose its contact TD1, the energizing circuit for motor relay MR is interrupted again, causing motor relay to once more stop the compressor. At the same time as was previously described, closing of contacts TD1 energizes stepping relay SR for the second time which opens its contacts SR1, while its contact SR4 remain closed. With the opening of contacts TD2, time delay heater TD starts to cool again.

After approximately 75 seconds, the heater TD has cooled sufficiently to return time delay switch to released condition to close its contacts TD2 and reopening its contacts TD1. As contacts TD1 reopen, stepping relay SR is again deenergized, causing reclosing of its contacts SR1 again preparing a circuit for coil SR through contacts SR4, but without effect. Stepper relay SR also steps to second position but without effect, as has been previously stated. Simultaneously contacts TD2, in reclosing, again complete the previously described circuit for motor relay MR, which again starts the compressor motor for a third try at attaining proper oil pressure as was previously described.

Next assume that again net oil pressure fails to reach proper operating level, such that pressure sensing switch DPC remains with its contacts DPC1 closed a sufficient time to cause heater TD to actuate the time delay switch TDS to open its contacts TD2 and close its contacts TD1. Contacts TD2 in opening again stops the motor, as was described.

Simultaneous with stopping of the compressor motor, closing of contacts TD1 of the time delay switch TDS again energizes stepping relay SR, causing its contacts SR1 to reopen. The time delay heater TD starts to cool and after approximately 75 seconds the heater has cooled sufficiently to release and reopen its contacts TD1 deenergizing stepping relay SR causing its contacts SR1 to reclose and the relay to step to third position. In stepping the relay opens its contacts 1SR3 and 2SR3, as was described for FIG. 2.

Opening of stepping relay contacts 1SR3 in the circuit of motor relay coil MR prevents operation of the compressor.

Time delay switch TDS in releasing, also recloses its contacts TD2, but without effect, since opening of contacts 2SR3 of the stepper relay in the circuit of the time delay heater TD prevents reenergization of the heater TD. Stepping relay contacts SR4, as was previously described, remain closed. The system is now shut down in what is termed "lockout" condition awaiting a service man.

Next assume that a maintenance man remedies the trouble and wishes to restart the system. Under such conditions, he momentarily actuates reset switch RS to open its contacts RS1 and close its contacts RS2. With the thermostat contacts T closed, and the time delay switch in its deenergized condition with its contacts TD2 closed, as was described, closing of reset switch contacts RS2 completes a circuit for coil SR of the stepper relay through presently closed contacts SR1 and SR4 (in third step position) again energizing stepping relay SR. Relay SR, upon energization, opens its contacts SR1 which causes immediate deenergization of the relay. Upon the fourth deenergization of the relay, it steps to its zero position reopening its contacts SR4, while reclosing its contacts 1SR3 and 2SR3 (as shown in FIG. 1 and 2) placing the control again in condition for "startup" subject to the operating control of the thermostat and three more tries at successful operation, was previously described.

Next will be described a compressor "run" sequence during which sufficient net oil pressure is sensed on second try such that the system is then put in the "run" mode subject to the operating controls. Under such conditions, it is necessary that the stepping relay automatically return to its zero position to provide for subsequent starts subject to thermostat, as will now be described.

Assume that thermostat T closes its contacts, completing a circuit for motor relay MR through switch contacts TD2, reset switch contacts RS1 and stepping relay contacts 1SR3, causing starting of the compressor motor. At the same time, as was previously described, the circuit for heater TD is completed through contacts DPC1 and 2SR3.

Next assume that oil pressure fails to reach the operating level during the first timed trial period, such that switch contacts DPC1 remain closed, causing the time delay switch TDS to actuate its contacts TD2 open and close its contacts TD1. Opening of contacts TD2 interrupts the circuit to the motor relay MR, stopping the compressor motor and energization of the heater TD which starts to cool down. Closing of contacts TD1, energizes stepping relay SR, causing its contacts SR1 to open. After approximately 75 seconds, heater TD has cooled sufficiently to cause the TDS warp switch to reopen its contacts TD1 and reclose its contacts TD2. Stepper relay SR upon release steps to its first position, closing contacts SR1 and SR4. With the TDS switch in the start position again, a circuit is again completed for motor relay MR, once more starting the compressor for a second try at running. At the same time, heater TD is again energized through contacts TD2, DPC1 and 2SR3 to time this second trial period.

Next assume that the net coil pressure reaches operating level before the expiration of the trail period. This causes pressure switch DPC to actuate its contacts DPC1 open, removing energization from the heater TD which starts to cool down and close its contacts DPC2, completing a circuit through stepping relay contacts SR1 and SR4 (presently closed) for stepping relay coil SR. Under such conditions, the switch TDS remains in its run position with its contacts TD2 closed, maintaining relay MR energized and the compressor motor operating.

Completion of the circuit for relay coil SR by pressure switch contacts DPC2 effects stepping of the stepping relay through its second and third positions and then again as contacts SR1 reclose to its fourth or zero position in approximately one second for subsequent starts, as follows: As relay SR is energized through closing of contacts DPC2 of the pressure switch, its contacts SR1 open deenergizing stepping relay coil SR, since as previously described, its contacts SR4 remain closed until it reaches its zero position. As coil SR deenergizes, its contacts SR1 close again energizing stepping relay and SR, since contacts SR4 still remain closed. Relay SR is thus again energized, As coil SR is energized, it reopens contacts SR1 deenergizing the stepping relay coil SR which steps to its third step, momentarily reopening its contacts 1SR3 and 2SR3 and reclosing its contact SR1. Relay coil SR is energized, again, reopening its contact SR1. This deenergizes relay coil SR, causing its contacts SR1 to reclose while the relay steps into the zero position, causing its contacts SR4 to open stopping stepping operation and its contacts 1SR3 and 2SR3 to reclose, preparing the stepping relay circuit for the subsequent starts and trials. Reclosing of its contacts 1SR3 in the circuit of motor relay coil MR maintains the compressor in operating condition.

It may be noted that during this stepping to zero position, the circuit to motor relay MR is momentarily interrupted as contacts 1SR3 are opened and reclosed as the relay steps from its third to zero or fourth position. Such momentary interruption is only a fraction of a second and relay MR is selected with a "dropout" time such that the relay does not deenergize sufficiently to release during such momentary interruption. Consequently, the relay MR does not release during such fractional interruption of its energizing circuit and the compressor motor remains in operation.

It is, thus, seen that the subject cycling safety control provides a predetermined number of attempts to start a compressor system under conditions where the net oil pressure fails to reach proper operating level and then provides "lockout" of the system. Should the system attain proper operating levels during any of these attempts, the system is put in the "run" mode of operation subject to the thermostat control, while the cycling means in the form of stepping relay is automatically reset to zero for subsequent trials. This control in the preferred embodiment provides three trials at starting. Any number of trials deemed sufficient to provide for purging of the crank case oil of the refrigerant and yet not enough to damage the compressor should there be a malfunction of the oil-pressure means can be provided.

The FIG. 3 modification of the FIG. 1 control circuit is provided for installations where it is desired to make several attempts at starting should the pressure at the input side of the compressor (low pressure) fail to reach at least a certain limit during starting. This failure sometimes happens under conditions where the compressor is operated under low ambient temperature conditions. To provide three attempts at starting under such conditions, assume that the circuit of FIG. 1 is modified, as shown in FIG. 3, such that the differential pressure control switch DPC is replaced with a low pressure control switch designated LPC. Such switch LPC is actuated by the actuator PI of a pressure sensor located at the input to the compressor, as designated by broken line 2 (FIG. 1). Actuator PI (FIG. 3) actuates low-pressure switch LPC to open its contacts LPC1 against the force of biasingspring S and closes its contacts LPC2 under conditions where the pressure at the input exceeds at least a predetermined amount. Below such amount, switch LPC is maintained by spring S with its contacts LPC1 closed and its contacts LPC2 open.

The circuit of FIG. 1, modified per FIG. 3, operates for low pressure failure in the same manner as previously described for the differential pressure control to make three attempts at attaining sufficient pressure at the inlet to compressor to place the system in "run" mode. Under such conditions, the control cycles through three tries unless actuator PI senses sufficient pressure at the inlet to actuate low pressure switch LPC to its upward position (FIG. 3). Actuation of switch LPC opens its contact LPC1, terminating timing operation of heater TD such that time delay switch TDS, through its contacts TD2 and reset switch RS, maintain motor relay coil MR energized, as was previously described. At the same time, low pressure switch LPC closes its contacts LPC2 causing operation of stepping relay SR to zero position, as was described for switch DPC operation.

The FIG. 4 modification of the cycling control system of FIG. 1 places the compressor in the "run" mode only under conditions where both the pressure at the low (inlet) side is sensed by a switch LPC to be at least above a certain minimum and the net differential pressure delivered by the oil pump is within proper range as sensed by the differential pressure switch DPC of FIG. 1. Under such conditions, as can be seen by the modification of the circuit in FIG. 4, unless both low pressure switch LPC and differential pressure switch DPC are both actuated to their upward position, engaging their respective contacts LPC2 and DPC2, the system will not be placed in a "run" mode, but will cycle through three attempts at attaining both pressures, as was previously described in FIG. 1. In other words, with sufficient low pressure and switch LPC in its upward position engaging its contact LPC2 but with insufficient differential pressure such that switch DPC remains in its position engaging contacts DPC1, the heater TD will be energized through three trials through contacts LPC2, DPC1 and 2SR3, as was previously described. Conversely, under conditions where sufficient differential pressure is sensed by pressure DPC to engage its contacts DPC2, while insufficient pressure is sensed at the low pressure inlet by low pressure switch LPC such that it maintains its contacts LPC2 open, the system will not be placed in a "run" mode, but instead will cycle through three attempts at attaining sufficient pressures. To repeat, only under conditions where both low pressure switch LPC and differential pressure switch DPC both sense differential operating pressures and both switches are in their upward positions engaging their respective contacts LPC2 and DPC2, is the system placed in the "run" mode of operation, as was previously described from FIG. 1 circuit. The circuit otherwise operates as was previously described for the FIG. 1 embodiment.

As changes can be made of the above described construction and many apparent different embodiments of this invention can be made, without departing from the scope thereof, it is intended that all matter contained in the above description or shown on the accompanying drawings be interpreted as illustrative only and not in a limiting sense.

What we claim is:

1. In a refrigeration system including a compressor, a motor for driving the compressor and means for controlling operation of said motor, a safety control functioning as a circuit interrupt safety switch for controlling said motor operating control means, said compressor during operation generating high pressure of refrigerant at its outlet side and a relatively low pressure at its inlet side, and including lubricating mechanism for said compressor for pumping lubricating oil at an output pressure for said compressor, said safety control comprising; a first pressure sensor responsive to the output pressure of said lubricating mechanism, a second pressure sensor responsive to said pressure at said inlet side of said compressor, electrothermomechanical timer mechanism for timing a trial period, said timer mechanism during such period causing said motor operating control means to run said motor and at the expiration of which period said timer mechanism causes said motor operating means to stop said motor, pressure-responsive means responsive to a selected one of said pressure sensors for disabling said timer mechanism preventing stopping of the said motor under conditions where the pressure sensed attains a certain predetermined level before expiration of said trial period, and characterized in that, cycling means are provided responsive to said timer mechanism for causing a predetermined number of reoperations of said motor operating control means for consecutive timed trial periods by said timer mechanism.

2. The system of claim 1, wherein said cycling means includes an electromagnetic stepper relay having four step positions, and said timer mechanism includes a thermal expansion timer having a first pair of normally opened contacts in an energizing circuit for said stepper relay and a second pair of normally closed contacts in an energizing circuit for said motor operating control means.

3. The system of claim 2, wherein said stepper relay includes contacts operable at its third step for disabling said timer mechanism and motor operating control means for stopping said cycling.

4. The system set forth in claim 3, wherein manual reset means are provided operable for selectively energizing said stepper relay for stepping said relay back to its first position.

5. The system of claim 3, wherein said pressure responsive means is a net differential pressure means responsive to the net differential of said pressures sensed by said first sensor at said lubricating mechanism output and said second sensor at said inlet for causing termination of said timing only under conditions where the net differential of said sensed pressures exceeds at least a predetermined amount.

6. The system of claim 3, wherein said pressure responsive means is a low pressure control responsive to said pressure sensed at the inlet side of said compressor by said second sensor for actuation to the condition terminating said timed period under conditions where said low pressure sensed exceeds at least a predetermined minimum.

7. The system of claim 3, wherein said pressure-responsive means includes low-pressure circuit interrupting means responsive to pressure sensed at said inlet side by said second sensor for actuation to a second condition under conditions where said inlet pressure sensed exceeds at least a predetermined minimum, and also includes differential pressure circuit interrupt means responsive to the net differential pressure between said sensed inlet pressure side and that sensed at the output of said lubricating mechanism by said first pressure sensor for actuation to a second condition under conditions where said net differential pressure exceeds at least a certain amount, characterized in that, said low pressure and net differential pressure interrupt means are interconnected in the energizing circuit of said stepper relay and timer mechanism for terminating said timed period only under conditions where both said low pressure and differential pressure controls are in their said second actuated conditions, and under all other conditions cause said cycling control to effect said predetermined number of cycles.

8. The refrigeration system of claim 4, wherein said timer mechanism includes a thermal timer having a heater and a pair of normally closed contacts and a pair of normally opened contacts, and wherein said cycling control is a stepper relay having an energizing coil subject to the closing of said normally open pair of timer contacts, said stepper relay having four positions and four pairs of contacts, a first stepper pair of contacts opening with each energization of the stepper relay and closing with each deenergization thereof, second and third pairs of normally closed stepper contacts responsive to the third deenergization of said stepper relay coil for being actuated open and remaining open until a fourth deenergization and return to zero position of said stepper relay, said stepper relay having a fourth pair of contacts normally open which contacts are closed by upon the first step of said relay to its first position and remain closed until said relay steps to its fourth and zero position, and wherein said first and fourth pair of stepper contacts are connected in series circuit with said stepper relay coil and with the series circuit of a normally open pair of contacts of said pressure responsive means and said normally closed pair of contacts of said timer, and wherein said reset means includes a normally closed pair of contacts in series circuit with said second pair of normally closed stepper contacts, said motor control and said normally closed contacts of the timer, and wherein, said third pair of normally closed stepper relay contacts are connected in series with said timer heater, said normally closed contacts of said pressure-responsive means, and the normally closed contacts of said timer for providing a timed three cycles of operation of said motor-operating control means, said pressure responsive means upon actuation during any of said timed intervals terminating the timing of said timer and maintaining said motor operating control means in run condition, while effecting stepping of said stepper relay automatically to reset condition through said first set of normally closed stepper contacts and said fourth of stepper contacts.

9. The system of claim 8, wherein said manual reset means when actuated provides a shunt circuit path about said pressure responsive control for causing sequential cycling operating of said stepper relay to its said zero position.

UNITED STATES PATENT OFFICE
CERTIFICATE OF CORRECTION

Patent No. 3,599,439     Dated August 17, 1971

Inventor(s) Dwight C. Lewis, et al

It is certified that error appears in the above-identified patent and that said Letters Patent are hereby corrected as shown below:

Column 3, line 49, after "1SR3" insert -- and 2SR3 -- ; line 69, after "fourth" insert -- step -- . Column 4, line 28, before "being" insert -- is -- . Column 8, line 38, after "operating" insert -- control -- . Column 10, line 31, after "fourth" insert -- set -- .

Signed and sealed this 24th day of October 1972.

(SEAL)
Attest:

EDWARD M. FLETCHER, JR.                ROBERT GOTTSCHALK
Attesting Officer                      Commissioner of Patents